United States Patent
Burkhard

(10) Patent No.: US 10,246,067 B2
(45) Date of Patent: Apr. 2, 2019

(54) BRAKE SYSTEM AND METHOD FOR OPERATING A BRAKE SYSTEM

(71) Applicant: Continental Teves AG & Co. oHG, Frankfurt (DE)

(72) Inventor: Dieter Burkhard, Bingen-Büdesheim (DE)

(73) Assignee: CONTINENTAL TEVES AG & CO. OHG, Frankfurt am Main (DE)

(*) Notice: Subject to any disclaimer, the term of this patent is extended or adjusted under 35 U.S.C. 154(b) by 0 days.

(21) Appl. No.: 15/661,928

(22) Filed: Jul. 27, 2017

(65) Prior Publication Data

US 2017/0320477 A1   Nov. 9, 2017

Related U.S. Application Data

(63) Continuation of application No. PCT/EP2016/050939, filed on Jan. 19, 2016.

(30) Foreign Application Priority Data

Jan. 19, 2016   (DE) .................. 10 2015 201 331

(51) Int. Cl.
*B60T 8/40*   (2006.01)
*B60T 13/68*  (2006.01)
(Continued)

(52) U.S. Cl.
CPC .......... *B60T 8/4054* (2013.01); *B60T 8/172* (2013.01); *B60T 8/1761* (2013.01);
(Continued)

(58) Field of Classification Search
CPC ...... B60T 8/4054; B60T 8/172; B60T 8/1761; B60T 8/3275; B60T 8/4077; B60T 8/4081; B60T 13/686; B60T 13/745
(Continued)

(56) References Cited

U.S. PATENT DOCUMENTS

| | | | |
|---|---|---|---|
| 4,767,165 A * | 8/1988 | Burgdorf | B60T 8/441 303/114.3 |
| 2009/0212621 A1 * | 8/2009 | Drott | B60T 8/38 303/14 |

(Continued)

FOREIGN PATENT DOCUMENTS

| | | |
|---|---|---|
| CN | 104105626 A | 10/2014 |
| CN | 104169141 A | 11/2014 |

(Continued)

OTHER PUBLICATIONS

International Search Report and Written Opinion dated Mar. 18, 2016 from corresponding International Patent Application No. PCT/EP2016/050939.

(Continued)

*Primary Examiner* — Marthe Y Marc-Coleman

(57) ABSTRACT

A method for operating a brake system for motor vehicles comprises in a normal control mode of the system, a displacement of a piston for a pressure supply device is terminated, and inlet valves of the wheel brakes are closed in the event of a specified brake condition. The normal control mode is switched to a special control mode in the event of a specified condition for the pressure supply device. In the event of the specified brake condition in the special control mode, a displacement of the piston of the pressure supply device is terminated by outputting an actuation signal to the pressure supply device, and for at least one selected wheel brake, the corresponding inlet valve is kept open and the corresponding outlet valve is opened at least temporarily while the inlet valves of the remaining wheel brakes are closed.

19 Claims, 2 Drawing Sheets

(51) Int. Cl.
  *B60T 8/172* (2006.01)
  *B60T 8/1761* (2006.01)
  *B60T 8/32* (2006.01)
  *B60T 13/74* (2006.01)
(52) U.S. Cl.
  CPC .......... *B60T 8/3275* (2013.01); *B60T 8/4077* (2013.01); *B60T 8/4081* (2013.01); *B60T 13/686* (2013.01); *B60T 13/745* (2013.01)
(58) Field of Classification Search
  USPC ............. 701/78; 303/DIG. 10, 113.1, 14, 15, 303/114.3, 155
  See application file for complete search history.

(56) References Cited

U.S. PATENT DOCUMENTS

2012/0169112 A1* 7/2012 Jungbecker .......... B60T 8/4081
                                                    303/9.75
2015/0021978 A1* 1/2015 Feigel ...................... B60T 8/36
                                                    303/15

FOREIGN PATENT DOCUMENTS

| DE | 102010040097 | A1 | 3/2011 |
| DE | 102011077329 | A1 | 1/2012 |
| DE | 102013105377 | A1 | 11/2014 |
| DE | 102013210563 | A1 | 12/2014 |
| DE | 102013014173 | A1 | 2/2015 |
| JP | 2012206853 | A | 10/2012 |
| WO | 2013131891 | A1 | 9/2013 |

OTHER PUBLICATIONS

German Search Report dated Jan. 12, 2015 for corresponding German Patent Application No. 10 2015 201 331.6.
Office Action dated Dec. 10, 2018 from corresponding Chinese Patent Application No. 201680007058.6.

* cited by examiner

BRAKE SYSTEM AND METHOD FOR OPERATING A BRAKE SYSTEM

CROSS-REFERENCE TO RELATED APPLICATIONS

This application claims the benefit of PCT Application PCT/EP2016/050939, filed Jan. 1, 2016, which claims priority to German Application DE 10 2015 201 331.6, filed Jan. 24, 2015. The disclosures of the above applications are incorporated herein by reference.

TECHNICAL FIELD

The invention concerns a method for operating a brake system.

BACKGROUND

A "brake-by-wire" brake system for motor vehicles is known from DE 10 2010 040 097 A1 that has a brake pedal-operated tandem master brake cylinder, a simulator that is hydraulically connected to the master brake cylinder, an electrically controlled pressure supply device that is formed by a cylinder-piston assembly with a hydraulic pressure chamber, the piston of which can be displaced by an electromechanical actuator, and a pressure modulation unit for adjusting wheel-specific brake pressures comprising an inlet valve and an outlet valve per wheel brake. For performing normal braking in the "brake-by-wire" operating mode of the brake system, wheel brakes are subjected to the system pressure of the pressure supply device with the supply valves and inlet valves opened by the electrically controlled advancement of the piston of the pressure supply device. If the driver is carrying out panic braking, which causes entry into anti-lock control for all wheel brakes, the initial build-up of brake pressure at each of the wheel brakes on entry into anti-lock control must be terminated as quickly as possible. For this purpose, the inlet valves of all wheel brakes are closed and the advancement of the piston of the pressure supply device is terminated.

As high-pressure build-up gradients are initially wanted during panic braking for safety reasons, the pressure supply device or the driving electromechanical actuator thereof is operated highly or maximally dynamically in said situation. The closure of all inlet valves on entry into anti-lock control can then lead to a "post-displacement" of a volume of pressure medium from the pressure chamber of the pressure supply device, even in the case of a simultaneously output actuation command to stop the electromechanical actuator, owing to the inertia of the electromechanical actuator. This enables a very high back pressure to occur in the system, which can result in damage to the electromechanical actuator or in the extreme case to bursting of the system.

In DE 10 2011 077 329 A1, a method for controlling an electrohydraulic "brake-by-wire" brake system with an anti-lock control function, an inlet valve and an outlet valve per wheel brake and an electrically actuated pressure supply device is described, which comprises a cylinder-piston assembly with a hydraulic pressure chamber, the piston of which can be displaced by an electromechanical actuator. In this case, it is described in DE 10 2011 077 329 A1 that during anti-lock control at least one wheel brake is always connected, in the sense of complete pressure balance between the wheel brake and the pressure chamber, to the hydraulic pressure chamber of the pressure supply device via the associated open inlet valve, so that the brake pressure profile at said wheel brake is exclusively varied by the reciprocal movement of the piston of the pressure supply device. However, this is not reasonably possible in all braking situations.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating a brake system with an electrically controlled pressure supply device that is formed by a cylinder-piston assembly with a hydraulic pressure chamber is disclosed. The piston of the cylinder-piston assembly can be displaced by an electromechanical actuator. Damage to the brake system when closing the inlet valves of all wheel brakes that are connected to the pressure supply device is therefore prevented.

A special control mode is switched to if a predetermined condition for the pressure supply device exists in a brake system. When in a normal control mode, if a predetermined braking condition exists a displacement of the piston of the pressure supply device is terminated by outputting an actuation signal to the pressure supply device and the inlet valves of the wheel brakes, i.e. of all the wheel brakes that are connected to the pressure supply device, are closed. If the predetermined braking condition exists in the special control mode, the displacement of the piston of the pressure supply device is terminated by outputting an actuation signal to the pressure supply device and for at least one selected wheel brake the associated inlet valve is kept open and the associated outlet valve is opened at least temporarily, whereas the inlet valves of the remaining wheel brakes are closed.

Therefore, the brake system is protected against damage, because if the predetermined braking condition exists, any volume of pressure medium displaced from the pressure chamber of the pressure supply device after outputting the actuation signal owing to the inertia of the electromechanical actuator can flow out into the pressure medium storage container via the at least temporarily open outlet valve.

In the pressure supply device, a displacement of the piston in a pressure build-up direction leads to the displacement of pressure medium from the pressure chamber.

The termination of the displacement of the pressure supply device piston can be the termination of the displacement in the pressure build-up direction.

A check is may be carried out as to whether a predetermined condition for the pressure supply device exists, and on detecting the presence of the condition for the pressure supply device, the mode is changed to the special control mode.

A brake system that can be actuated in a "brake-by-wire" operating mode both by the driver of the vehicle and also independently of the driver of the vehicle, is normally operated in the "brake-by-wire" operating mode and can be operated in a fallback mode.

The predetermined braking condition can be the condition that a build-up of pressure at each of the wheel brakes connected to the pressure supply device is to be terminated or stopped. Said condition or requirement is, for example, requested by an anti-lock control function or another control function of the brake system.

The predetermined condition for the pressure supply device can be the condition that the pressure supply device is in a critical operating state. A critical operating state exists if the electromechanical actuator is being operated very dynamically.

A critical operating state is detected using a speed of the pressure supply device. A critical operating state exists, for example, if the speed of the pressure supply device exceeds a predetermined speed threshold value. A speed of the piston of the pressure supply device or a rotation rate of the electromechanical actuator is evaluated for detection of the critical operating state.

The brake system may comprise a displacement sensor that detects the displacement travel or the position of the piston of the cylinder-piston assembly. Using the change in position of the piston, the speed of the piston can be determined.

The electromechanical actuator comprises an electric motor and a rotation-translation gearbox, wherein a rotor position sensor is provided for detecting a rotor position of the electric motor. Using the change in the rotor position, the rotation rate of the electric motor, which represents the speed of the piston, can be determined.

The critical operating state of the pressure supply device can also be detected using a position of the pressure supply device. The location/position of the piston of the pressure supply device is used for this purpose.

For reasons of driving stability and/or in order to ensure the fastest possible discharge of the displaced volume of pressure medium, more than a single wheel brake may be selected.

According to a development of the method, the wheel brakes of an axle of the motor vehicle are selected wheel brakes, i.e. the inlet valves thereof are not closed and the outlet valves thereof are at least temporarily open. For a short brake travel the wheel brakes of the rear axle of the motor vehicle may be the selected wheel brakes.

In order to open the outlet valves as briefly as possible and to prevent an excessive loss of pressure medium in the pressure medium storage container, an estimation of pressure medium volume may be carried out. It is determined how much volume of pressure medium is yet to be discharged from the pressure supply device following the output of the actuation signal until the piston of the pressure supply device comes to a standstill or the predetermined condition for the pressure supply device no longer exists, i.e. the operating state of the piston of the pressure supply device becomes below the critical operating state.

At least one opening time for the outlet valve of the selected wheel brake or for the outlet valves of the selected wheel brakes is determined using the estimated volume of pressure medium.

If the estimated volume of pressure medium has been discharged through the outlet valve or the outlet valves, the outlet valve of the selected wheel brake is closed again or the outlet valves of the selected wheel brakes are closed again, and the inlet valve of the selected wheel brake is closed or the inlet valves of the selected wheel brakes are closed.

According to a development of the method, a change from the special control mode into the normal control mode is carried out if the predetermined condition for the pressure supply device no longer exists.

A brake system may comprise a master brake cylinder with a housing and two pistons that bound two pressure chambers in the housing, wherein each pressure chamber is separably connected to wheel brakes via an electrically actuated, normally open isolating valve.

A brake pedal is coupled to the master brake cylinder for actuating the master brake cylinder, wherein actuation of the brake pedal is monitored. The brake system may comprise a simulator that is hydraulically connected to the master brake cylinder, the action of which can be turned on and off by means of an electrically actuated, normally closed simulator valve. At least one electrically actuated, normally closed supply valve is disposed between the pressure supply device and the inlet valves.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
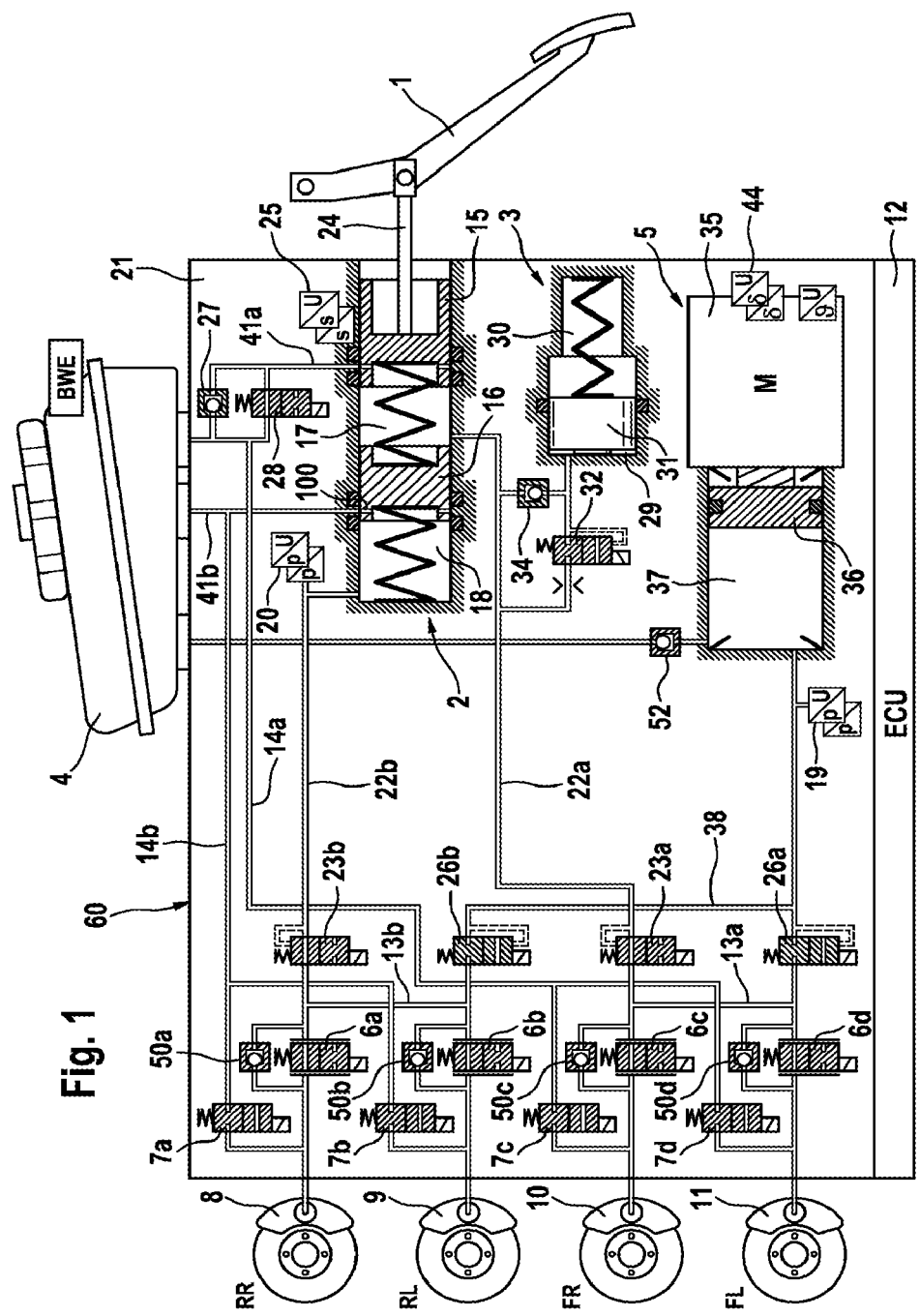
FIG. 1 shows schematically an exemplary embodiment of an example of a brake system for carrying out a method according to the invention.

In FIG. 1, an exemplary embodiment of a brake system for carrying out a method according to the invention is represented schematically. The brake system essentially comprises a master brake cylinder 2 that can be actuated by an actuation pedal or brake pedal 1, a simulator 3 that interacts with the master brake cylinder 2, a pressure medium storage container 4 at atmospheric pressure that is associated with the master brake cylinder 2, an electrically controlled pressure supply device 5, which is formed by a cylinder-piston assembly with a hydraulic pressure chamber 37, the piston of which 36 can be displaced by an electromechanical actuator, an electrically controlled pressure modulator for adjusting wheel-specific brake pressures and an electronic control and regulating unit 12.

The pressure modulator, which is not referred to in detail, comprises for example, for each hydraulically actuated wheel brake 8, 9, 10, 11 of a motor vehicle that is not shown, an inlet valve 6a-6d and an outlet valve 7a-7d that are hydraulically interconnected via center ports and that are connected to the wheel brakes 8, 9, 10, 11. The input ports of the inlet valves 6a-6d are supplied with pressure by brake circuit supply lines 13a, 13b, the pressure being derived in a "brake-by-wire" operating mode from a system pressure that exists in a system pressure line 38 that is connected to a pressure chamber 37 of the electrically controlled pressure supply device 5. A non-return valve 50a-50d that opens towards the brake circuit supply lines 13a, 13b is connected in parallel with the inlet valves 6a-6d in each case.

In a fallback mode, the brake circuit supply lines 13a, 13b are subjected to the pressures of the pressure chambers 17, 18 of the master brake cylinder 2 via hydraulic lines 22a, 22b. The output ports of the outlet valves 7a-7d are connected in pairs to the pressure medium storage container 4 via return lines 14a, 14b.

According to an exemplary embodiment, the wheel brakes 10 and 11 are associated with the right front wheel (FR) and the left front wheel (FL) and are connected to the brake circuit supply line 13a (first brake circuit). The wheel brakes 8 and 9 are associated with the right rear wheel (RR) and the left rear wheel (RL) and are connected to the brake circuit supply line 13b (second brake circuit). Other brake circuit distributions are conceivable.

The master brake cylinder 2 comprises two pistons 15, 16 disposed one after the other in a housing 21 that bound hydraulic pressure chambers 17, 18. The pressure chambers 17, 18 are connected to the pressure medium storage container 4 on one side via radial bores formed in the piston 15, 16 and corresponding pressure equalizing lines 41a, 41b, wherein the connections can be shut off by a relative displacement of the piston 17, 18 in the housing 21. The pressure chambers 17, 18 are connected on the other side to the aforementioned brake circuit supply lines 13a, 13b by the hydraulic lines 22a, 22b.

The pressure equalizing line 41a contains a parallel circuit of a normally open (NO) diagnosis valve 28 with a non-return valve 27 that closes towards the pressure medium storage container 4. The pressure chambers 17, 18 accommodate restoring springs that are not referred to in detail and that position the pistons 15, 16 in an initial position when the master brake cylinder 2 is not being actuated.

A piston rod 24 couples the pivotal motion of the brake pedal 1 resulting from a pedal actuation to the translational motion of the first (master brake cylinder) piston 15, the actuation travel of which is detected by a displacement sensor 25 that is redundantly implemented. As a result, the corresponding piston travel signal is a measure of the brake pedal actuation angle. It represents a braking demand of the driver of the vehicle.

In each of the line segments 22a, 22b connected to the pressure chambers 17, 18, an isolating valve 23a, 23b is disposed that is implemented as an electrically actuated, normally open (NO), 2/2-way valve. The hydraulic connection between the pressure chambers 17, 18 of the master brake cylinder and the brake circuit supply lines 13a, 13b can be shut off by the isolating valves 23a, 23b.

A pressure sensor 20 that is connected to the line segment 22b detects the pressure built up in the pressure chamber 18 by a displacement of the second piston 16.

The simulator 3 can be hydraulically coupled to the master brake cylinder 2 and essentially consists for example of a simulator chamber 29, a simulator spring chamber 30 and a simulator piston 31 separating the two chambers 29, 30 from each other. The simulator piston 31 is supported on the housing 21 by an elastic element that is disposed in the simulator spring chamber 30 (for example a spring), which is pretensioned. The simulator chamber 29 can be connected to the first pressure chamber of the master brake cylinder 2 by means of an electrically actuated simulator valve 32.

If there is a pedal force and the simulator valve 32 is open, pressure medium flows from the master brake cylinder pressure chamber 17 into the simulator chamber 29. A non-return valve 34 that is disposed hydraulically antiparallel to the simulator valve 32 enables a substantially unhindered return flow of the pressure medium from the simulator chamber 29 to the master brake cylinder pressure chamber 17 independently of the switch state of the simulator valve 32. Other embodiments and connections of the simulator to the master brake cylinder 2 are conceivable.

The electrically controlled pressure supply device 5 is implemented as a hydraulic cylinder-piston assembly or a single-circuit electrohydraulic actuator, the piston 36 of which, which bounds the pressure chamber 37, can be actuated by a schematically indicated electric motor 35 with the interposition of a likewise schematically represented rotation-translation gearbox. A rotor position sensor that is only schematically indicated and that is used to detect the rotor position of the electric motor 35 is denoted by the reference character 44. In addition, a temperature sensor can also be used for sensing the temperature of the motor winding.

It is also conceivable that the pressure supply device is implemented as a dual-circuit electrohydraulic actuator with two pressure chambers, wherein one of the brake circuit supply lines 13a, 13b is associated with each of the pressure chambers or each of the pressure chambers is connected to one of the brake circuit supply lines 13a, 13b.

The actuator pressure produced by the force action of the piston 36 on the pressure medium enclosed in the pressure chamber 37 is fed into the system pressure line 38 and detected by a redundantly implemented pressure sensor 19. With the supply valves 26a, 26b open, the pressure medium passes into the wheel brakes 8, 9, 10, 11 to actuate them. By reciprocal displacement of the piston 36 with the supply valves 26a, 26b open (and open inlet valves 6a-6d), a build-up and reduction of wheel brake pressure is thus carried out for all wheel brakes 8, 9, 10, 11 during normal braking in the "brake-by-wire" operating mode.

The actuation of the electrically actuated components, in particular the valves 6a-6d, 7a-7d, 23a, 23b, 26a, 26b, 28, 32 and of the electric motor 35 of the pressure supply device 5, is performed by the electronic control and regulating unit 12. The signals of the sensors 19, 20, 25 and 44 are also processed in the electronic control and regulating unit 12.

The method can also be carried out in a brake system that comprises a cylinder-piston assembly with at least one hydraulic pressure chamber, the piston of which can be displaced alternatively or simultaneously by an electromechanical actuator or by means of a brake pedal by a driver, i.e. in which the cylinder-piston assembly constitutes an electrically controlled pressure supply device and a brake pedal actuated master brake cylinder. Such a brake system is known from DE 10 2013 105 377 A1, for example.

Figure 2:
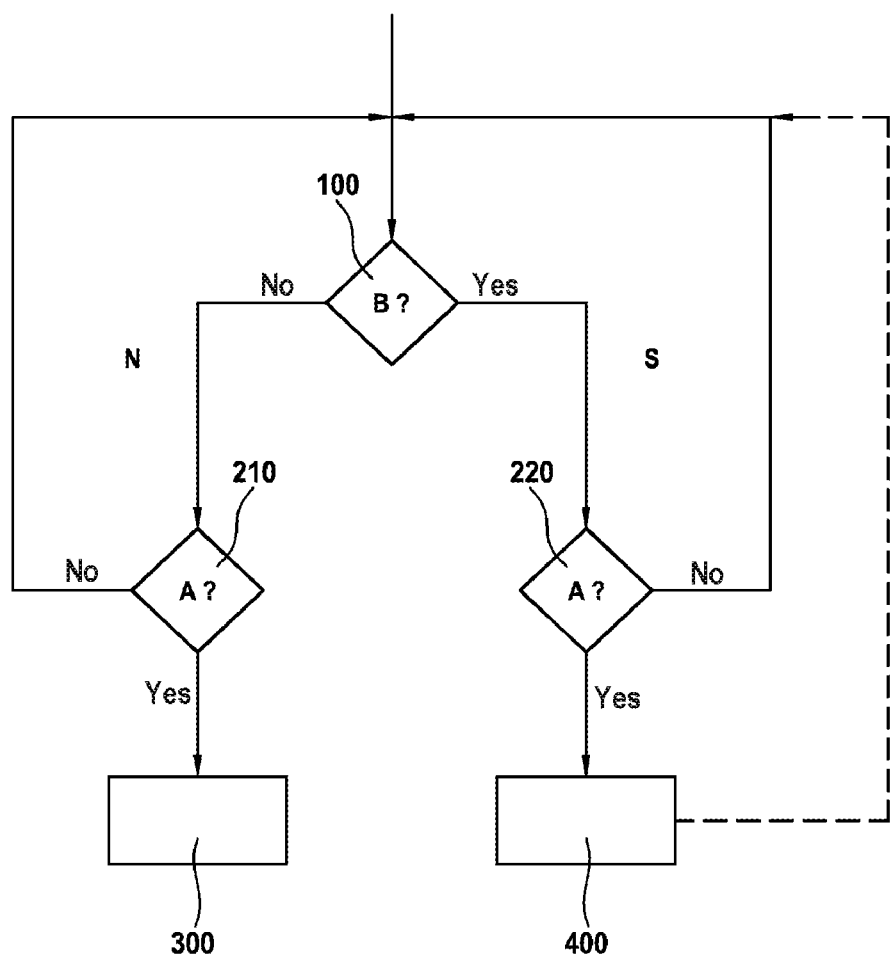
FIG. 2 shows schematically a block diagram for describing an example of a method.

In FIG. 2, a schematic block diagram for describing an example of a method for operating a brake system is represented. The example of a method is related to the example of a brake system of FIG. 1.

During braking by the pressure supply device 5, i.e. in the "brake-by-wire" operating mode, a check is repeatedly made in Block 100 as to whether a predetermined condition B of a critical state of the pressure supply device 5 exists. If the condition B does not exist (NO in Block 100), the brake system is in a normal control mode N. If in the normal control mode N a termination of the build-up of pressure on all wheel brakes connected to the pressure supply device 5 is demanded, i.e. if there is a corresponding predetermined braking condition A in Block 210 (JA in Block 210), then in Block 300 the inlet valves 6a-6d of the wheel brakes 8-11 are closed. Furthermore, in Block 300 an actuation signal is output to the pressure supply device 5 that terminates the advancement of the piston 36 of the pressure supply device 5.

If it is detected in Block 100 that the condition B exists for the pressure supply device 5 (JA in Block 100), i.e. that a critical state of the pressure supply device 5 exists, then a change is made to the special control mode S. if the corresponding braking condition A now exists in Block 220 (JA in Block 220), i.e. in the special control mode S a termination of the build-up of pressure on all wheel brakes connected to the pressure supply device 5 is demanded, then the inlet valves of the wheel brakes, at least of one wheel brake, i.e. the so-called selected wheel brake or selected wheel brakes, are closed in Block 400. For each selected wheel brake, the associated inlet valve is held open and the associated outlet valve is opened at least temporarily, so that the volume of pressure medium can be discharged from the pressure supply device 5 into the pressure medium storage container 4. Furthermore, in Block 400 an actuation signal is output to the pressure supply device 5, which terminates the advancement of the piston 36 of the pressure supply device 5.

Whether a critical operating state of the pressure supply device 5 exists or not is for example detected using the speed of the pressure supply device 5, for example the speed of displacement of the piston 36 or the rotation rate of the rotor of the electric motor 35. In addition, a position of the pressure supply device 5 can be evaluated for the detection, for example the location/position of the piston 36 or the rotor position of the electric motor 35.

For example, the wheel brakes of a vehicle axle, for example the wheel brakes 8, 9 on the rear axle, are selected wheel brakes. Accordingly, in Block 400 only the inlet valves 6c and 6d of the wheel brakes 10 and 11 are closed, whereas the inlet valves 6a and 6b of the selected wheel brakes 8 and 9 remain open and the outlet valves 7a and 7b of the selected wheel brakes 8 and 9 are opened. I.e., in comparison to Block 300, in Block 400 instead of closing the inlet valves 6a, 6b, opening the outlet valves 7a, 7b of the selected wheel brakes 8, 9 is carried out.

In order to optimally select the opening time of the outlet valves 7a, 7b of the selected wheel brakes 8, 9 or to detect the possibility of a termination of the special control of Block 400, for example an estimation of the pressure medium volume is carried out in Block 400, in which it is determined how much volume of pressure medium is still displaced from the pressure supply device 5 following the output of the actuation signal for termination of the advancement of the piston 36 until the piston 36 comes to a standstill. Using the volume of pressure medium estimated in this way, the suitable opening time of the outlet valves or the point in time for changing to the normal control of Block 300 can be determined, thus ensuring that sufficient volume of pressure medium has flowed into the pressure medium storage container 4 to prevent a critical pressure in the pressure supply device 5.

The special control of the Block 400 is for example also terminated if the pressure supply device 5 is no longer in a critical state (condition B no longer exists). Accordingly, condition B is checked repeatedly in Block 100, which is indicated schematically in FIG. 2 by the dashed arrow.

A further example of a method for operating a brake system is described below.

If anti-lock control (ABS control) is entered for each of the wheel brakes 8-11 during normal braking by means of the pressure supply device 5, for example owing to a large reduction in the coefficient of friction of the roadway, the pressure stop on the wheel brakes 8-11 demanded by the ABS control is implemented by closing all the wheel inlet valves 6a-6d. At the same time or promptly, an actuation signal for the drive 35 of the pressure supply device 5 is produced, which causes the termination of the displacement of the piston 36. As the desired pressure build-up gradient during normal braking and hence the drive dynamics of the drive 35 is normally not particularly high, the volume of pressure medium that is displaced from the pressure chamber 37 following the output of the actuation signal owing to the inertia of the drive and until the piston 36 finally comes to a standstill is not particularly great, and thus does not cause critical pressures in the pressure chamber 37 or the brake system.

In the case of very rapid initial gradients (i.e. large desired pressure build-up gradient), for example during panic braking, which result in entry into ABS control for all wheel brakes, by contrast the drive dynamics of the drive 35 of the pressure supply device 5 is very high. Here, in the case of a pressure stop demanded by the ABS control on the wheel brakes 8-11, very high system pressures in the pressure chamber 37 would occur by closing all inlet valves 6a-6d. This takes place in particular if the piston 36 of the pressure supply device 5, which is driven for example by a brushless electric motor 35 and a ball screw drive, is driven with a very high motor revolution rate of the electric motor 35 in order to produce the necessary dynamics for the build-up of brake pressure.

In said situation (operation of the electromechanical actuator with high or maximum dynamics), brake slip on all wheels would be detected by the ABS control and the inlet valves 6a-6d of all wheel brakes 8-11 would be closed in order to prevent a further build-up of brake pressure, then this would also lead to a reverse pressure medium volumetric flow and thereby to a high back pressure in the system even in the case of a simultaneous stop command to the drive of the pressure supply device 5 owing to the inertia of the electromechanical actuator. Said pressure rise can lead to damage to the drive of the pressure supply device 5, in an extreme case even to bursting of the system.

In order to prevent a pressure rise in the pressure chamber 37 of the pressure supply device 5 that is damaging to the brake system, for example on detecting a critical operating state of the pressure supply device (existence of condition B), the wheel pressure controller is set into the "burst protection" mode (special control mode S). In said mode— in the event of a requirement for stopping the pressure build-up on all wheels (existence of the braking condition A)—instead of closing the associated inlet valves 6a, 6b on the wheel brakes 8, 9 of the rear axle, the associated outlet valves 7a, 7b are opened in order to discharge the pressure medium volumetric flow, which is produced by the inertia of the drive 35 of the pressure supply device 5 and which leads to an unwanted pressure rise, directly into the pressure medium storage container 4.

The detection of a critical operating state of the pressure supply device 5 is carried out by evaluating the speed of the piston of the pressure supply device 5 or the motor revolution rate of the drive 35 of the pressure supply device 5 and possibly the piston position of the pressure supply device 5.

If the evaluation determines that the pressure supply device 5 is in a critical region/operating state ("Plunger in Critical Mode", existence of the condition B) and a pressure build-up stop on all wheels is demanded by a control function (for example an anti-lock control function ABS) (existence of the braking condition A), then a stop command is sent to the controller of the pressure supply device 5 and at the same time the special control of the inlet and outlet valves of the "burst protection" mode (Block 400) is activated in the wheel pressure controller.

In order to not lose too much volume of pressure medium through the reduction of pressure via the outlet valves 7a, 7b, the volume of pressure medium to be discharged is determined from the drive dynamics of the electromechanical actuator to be expected and the estimated dead time connected thereto until the stopping of the piston 36 and moreover the switching time (opening times) of the outlet valves 7a, 7b.

The special control (Block 400) is terminated if the estimated volume of pressure medium has been discharged. The outlet valves 7a, 7b are then closed again and the inlet valves 6a, 6b are switched, i.e. closed, at the same time.

The special control (Block 400) or the special control mode S can also be terminated if the pressure supply device 5 is no longer in a critical region.

In the normal control mode, output of the actuation signal to the pressure supply device and closing the inlet valves are carried out. In the special control mode, the output of the actuation signal to the pressure supply device and closing the inlet valves only on one axle, on the front axle, and opening the outlet valves on the other axle, on the rear axle, are carried out. The axle-specific switching of the corresponding valves takes place in order to ensure symmetrical pressure conditions in the wheel brakes of the axle.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating a slip-controlled brake system for motor vehicles comprising:
   connecting a plurality of wheel brakes to a pressure supply device via a plurality of electrically actuated normally open inlet valves, each associated with one of the plurality of wheel brakes;
   connecting the plurality of wheel brakes to a pressure medium storage container at atmospheric pressure via a plurality electrically actuated normally closed outlet valves, each associated with one of the plurality of wheel brakes;
   displacing a piston of a cylinder-piston assembly with an electromechanical actuator, wherein an electrically controlled pressure supply device is formed by the piston which at least partially defines at least one hydraulic pressure chamber;
   determining when a first predetermined braking condition exists in a normal control mode of the brake system;
   outputting an actuation signal to the pressure supply device to close the plurality of inlet valves of the wheel brakes when the first predetermined braking conditions exists in the normal control mode thereby terminating a displacement of the piston of the pressure supply device;
   determining when a second predetermined braking condition exists in a normal control mode of the brake system;
   changing the normal control mode to a special control mode when the second predetermined braking condition for the pressure supply device exists;
   determining when the first predetermined braking condition exists in the special control mode of the brake system;
   outputting an actuation signal to the pressure supply device to return at least one of the plurality of the inlet valves to normally opened when the first predetermined braking condition exists in the special control mode, thereby terminating a displacement of the piston of the pressure supply device;
   opening at least one of the plurality of outlet valves associated with a same wheel brake as the least one inlet valve at least temporarily when the first predetermined braking condition exists in the special control mode; and
   closing a remaining of the plurality of inlet valves when an estimated volume of pressure medium has been discharged through the at least one outlet valve.

2. The method of claim 1, wherein the at least one inlet valve which is not closed and the at least one of the plurality of outlet valves which are at least temporarily opened are inlet valves and outlet valve for rear axle wheel brakes.

3. The method of claim 1, further comprising estimating a pressure medium volume by determining how much volume of pressure medium is displaced from the pressure supply device following outputting of the actuation signal until one of: the piston of the pressure supply device comes to a standstill and the second predetermined braking condition for the pressure supply device is no longer met.

4. The method of claim 3, wherein determining at least one opening time for the at least one outlet valve using the estimated pressure medium volume.

5. The method of claim 3, further comprising:
   closing again the at least one outlet valve when the estimated pressure medium volume has been discharged through the at least one outlet valve; and
   closing the at least one inlet valve when the estimated pressure medium volume has been discharged through the at least one outlet valve.

6. The method of claim 1, further comprising changing from the special control mode to the normal control mode when the second predetermined condition for the pressure supply device is no longer met.

7. The method of claim 1, wherein the first predetermined braking condition is a termination of a build-up of pressure at each of the wheel brakes demanded by an anti-lock control function of the brake system.

8. The method of claim 1, wherein the second predetermined condition for the pressure supply device is a critical operating state of the pressure supply device detected using a speed of the pressure supply device.

9. The method of claim 8, wherein the second predetermined condition is detected using a position of the pressure supply device.

10. A control and regulating unit for a brake system with instructions for:
   connecting a plurality of wheel brakes to a pressure supply device via an electrically actuate a plurality of normally open inlet valves, each associated with one of the plurality of wheel brakes;
   connecting the plurality of wheel brakes to a pressure medium storage container at atmospheric pressure via a plurality of electrically actuated normally closed outlet valves, each associated with one of the plurality of wheel brakes;
   displacing a piston of a cylinder-piston assembly with an electromechanical actuator, wherein an electrically controlled pressure supply device is formed by the piston which at least partially defines at least one hydraulic pressure chamber;
   determining when a first predetermined braking condition exists in a normal control mode of the brake system;
   outputting an actuation signal to the pressure supply device to close the plurality of inlet valves when the first predetermined braking conditions exists in the normal control mode thereby terminating a displacement of the piston of the pressure supply device;

determining when a second predetermined braking condition exists in a normal control mode of the brake system;

changing the normal control mode to a special control mode when the second predetermined braking condition for the pressure supply device exists;

determining when the first predetermined braking condition exists in the special control mode of the brake system;

outputting an actuation signal to the pressure supply device to return at least one of the plurality of inlet valves of the wheel brakes to normally opened when the first predetermined braking condition exists in the special control mode, thereby terminating a displacement of the piston of the pressure supply device;

opening eat least one of the plurality of outlet valves at least temporarily when the first predetermined braking condition exists in the special control mode, wherein the at least one outlet valve is associated with the same wheel brake as the least one inlet valve; and closing a remaining of the plurality of inlet valves when an estimated volume of pressure medium has been discharged through the at least one outlet valve.

11. A slip-controlled brake system for motor vehicles comprising:

an electrically controlled pressure supply device;

a piston of a cylinder-piston assembly which is displaceable with an electromechanical actuator wherein at least partially defines at least one hydraulic pressure chamber;

a plurality of electrically actuated normally open inlet valves which each connect at least one of a plurality of wheel brakes to the pressure supply device;

a plurality of electrically actuated normally closed outlet valve which each connect at least one of a plurality of wheel brakes to a pressure medium storage container at atmospheric pressure;

a normal control mode of the brake system, wherein a displacement of the piston of the pressure supply device is terminated by outputting an actuation signal to the pressure supply device and the plurality of inlet valves of the wheel brakes are closed when a first predetermined braking condition is met;

a special control mode, wherein the normal control mode is changed to the special control mode when a second predetermined condition is met;

wherein a displacement of the piston is terminated when the first predetermined braking condition is met in the special control mode by outputting an actuation signal to the pressure supply device, and the at least one of the plurality of inlet valves is held open for at least one of the plurality of wheel brakes and at least one of the plurality of outlet valves is at least temporarily opened, wherein the at least one outlet valve is associated with same wheel brake as the least one inlet valve; and wherein a remaining of the plurality of inlet valves are closed when the estimated volume of pressure medium has been discharged through the at least one outlet valve when the first predetermined braking condition is met in the special control mode.

12. The system of claim 11, wherein the at least one inlet valve which is not closed and the at least one outlet valve which is at least temporarily opened are inlet valves and outlet valves for rear axle wheel brakes.

13. The system of claim 11, wherein a pressure medium volume is estimated based upon how much volume of pressure medium is displaced from the pressure supply device following the output of the actuation signal until one of: the piston of the pressure supply device comes to a standstill and the second predetermined condition for the pressure supply device is no longer met.

14. The system of claim 13, wherein at least one opening time for the at least one outlet valve is determined using the estimated pressure medium volume.

15. The system of claim 13, wherein the at least one outlet valve is closed when the estimated pressure medium volume has been discharged through the at least one outlet valve and the at least one inlet valve is closed when the estimated pressure medium volume has been discharged through the at least one outlet valve.

16. The system of claim 11, wherein the control mode is changed from the special control mode to the normal control mode when the second predetermined condition for the pressure supply device is no longer met.

17. The system of claim 11, wherein the first predetermined braking condition is a termination of a build-up of pressure at each of the wheel brakes demanded by an anti-lock control function of the brake system.

18. The system of claim 11, wherein the second predetermined condition for the pressure supply device is a critical operating state of the pressure supply device detected using a speed of the pressure supply device.

19. The system of claim 18, wherein the second predetermined condition is detected using a position of the pressure supply device.

* * * * *